United States Patent [19]
Spillman, Jr. et al.

[11] Patent Number: 5,433,115
[45] Date of Patent: Jul. 18, 1995

[54] CONTACTLESS INTERROGATION OF SENSORS FOR SMART STRUCTURES

[75] Inventors: William B. Spillman, Jr., Charlotte; Scott R. Durkee, New Haven, both of Vt.

[73] Assignee: Simmonds Precision Products, Inc., Akron, Ohio

[21] Appl. No.: 76,512

[22] Filed: Jun. 14, 1993

[51] Int. Cl.⁶ .................................................. G01L 1/00
[52] U.S. Cl. ................................................................ 73/773
[58] Field of Search ................. 73/765, 768, 769, 773, 73/786; 324/234, 236, 237, 239, 240; 340/870.02, 870.04, 870.18, 870.19, 870.31, 870.32

[56] References Cited

U.S. PATENT DOCUMENTS

| | | | |
|---|---|---|---|
| 2,447,734 | 8/1948 | Capuzzi | 73/773 |
| 3,224,257 | 12/1965 | Takami et al. | |
| 3,310,736 | 3/1967 | Bayly et al. | |
| 3,588,687 | 6/1971 | Kohler | 324/41 |
| 3,719,935 | 3/1973 | Chaney et al. | 340/206 |
| 3,758,845 | 9/1973 | MacKelvie et al. | 323/51 |
| 3,876,998 | 4/1975 | Richter et al. | 340/189 M |
| 4,000,967 | 1/1977 | Fennell | 324/40 |
| 4,223,300 | 9/1980 | Wiklund | 340/196 |
| 4,225,851 | 9/1980 | Reschovsky et al. | 340/870.18 |
| 4,367,460 | 1/1983 | Hodara | 340/550 |
| 4,425,511 | 1/1984 | Brosh | 307/106 |
| 4,470,300 | 9/1984 | Kobayashi | 73/304 C |
| 4,567,459 | 1/1986 | Folger et al. | 340/58 |
| 4,578,992 | 4/1986 | Galasko et al. | 73/146.5 |
| 4,590,466 | 5/1986 | Wiklund et al. | 340/870.28 |
| 4,646,066 | 2/1987 | Baughman et al. | 340/540 |
| 4,682,104 | 7/1987 | Lombard et al. | 324/208 |
| 4,717,905 | 1/1988 | Morrison, Jr. et al. | 340/58 |
| 4,725,839 | 2/1988 | Crowe | 340/870.31 |
| 4,741,341 | 5/1988 | Marach | 128/419 PT |
| 4,743,786 | 5/1988 | Ichikawa et al. | 310/111 |
| 4,781,056 | 11/1988 | Noel et al. | 73/1 B |
| 4,800,755 | 1/1989 | Fathauer et al. | 73/304 C |
| 4,808,911 | 2/1989 | Oaks | 324/57 Q |
| 4,891,973 | 1/1990 | Bollweber et al. | 73/146.5 |
| 4,900,921 | 2/1990 | Spillman, Jr. | 250/227 |
| 4,904,863 | 2/1990 | McDearmon | 250/227 |
| 4,922,096 | 5/1990 | Brennan | 244/3.16 |
| 4,930,852 | 6/1990 | Wheeler et al. | 350/96.10 |
| 4,983,034 | 1/1991 | Spillman, Jr. | 356/32 |
| 4,984,863 | 1/1991 | Parriaux et al. | 350/96.11 |
| 5,005,409 | 4/1991 | Hochstein | 73/304 C |
| 5,049,856 | 9/1991 | Crossfield | 340/551 |
| 5,058,436 | 10/1991 | Bellec et al. | 73/727 |
| 5,086,274 | 2/1992 | Gobin et al. | 324/239 |
| 5,107,833 | 4/1992 | Barsness | 128/419 PT |
| 5,144,299 | 9/1992 | Smith | 340/870.18 |
| 5,150,115 | 9/1992 | deJong et al. | 340/870.31 |
| 5,153,583 | 10/1992 | Murdoch | 340/825.54 |
| 5,165,283 | 11/1992 | Kurtz et al. | 73/727 |
| 5,181,423 | 1/1993 | Phillipps et al. | 73/724 |
| 5,196,845 | 3/1993 | Myatt | 340/870.31 |
| 5,278,442 | 1/1994 | Prinz et al. | 257/417 |

FOREIGN PATENT DOCUMENTS

| | | |
|---|---|---|
| 62-049279 | 3/1987 | Japan . |
| 3274420 | 1/1991 | Japan . |
| 4116425 | 4/1992 | Japan . |
| WO9100985 | 1/1991 | WIPO . |

OTHER PUBLICATIONS

Translation of WO9100985.
S. F. Masri et al. *Structure-unknown non-linear dynamic systems: identification through neural networks.*

*Primary Examiner*—Robert Raevis
*Attorney, Agent, or Firm*—Leonard L. Lewis; William E. Zitelli

[57] ABSTRACT

Apparatus for contactless interrogation of an sensor integrally disposed with a structure including a pair of coils for coupling signals across a gap between a sensing circuit having a sense coil and an interrogation circuit having an exciter coil connectable to a variable frequency supply, the sensing circuit comprising a circuit for changing current through the sense coil in relation to the sensor output; the interrogation circuit comprising a circuit for detecting current in the exciter coil induced by the sense coil current; and control means for determining the sensor output based on the exciter coil current compensated for the gap.

33 Claims, 2 Drawing Sheets

CONTACTLESS INTERROGATION OF SENSORS FOR SMART STRUCTURES

BACKGROUND OF THE INVENTION

The invention relates generally to apparatus and methods for interrogating sensors, and more particularly the invention relates to apparatus and methods for interrogation of sensors embedded in or mounted on structures.

Significant advances have been made in developing new high performance materials such as, for example, graphite/epoxy composites. These materials and many other composite types hold great promise for replacing conventional materials such as steel and aluminum in structures subjected to various environmental conditions such as high temperature, pressure, stress and strain. For example, carbon composite materials are expected to be used extensively in next generation aircraft for structures such as the wings and other air foil surfaces, engine drive shafts and so on just to name a few examples.

Although these materials have been shown to offer substantial benefits over conventional materials, industry acceptance of these materials, especially in the aerospace industry, has been limited due to the lack of statistical databases on their failure modes because of their relatively recent introduction. This situation presents a catch-22 because until such materials have been subjected to extensive use, such databases will remain relatively unavailable. Also, the lack of statistical analysis results in structures using these materials being overdesigned to the point that the benefits of using the improved materials are reduced or eliminated altogether.

Because of the need to characterize the real-world performance of these materials, extensive activity has been undertaken to develop "smart" structures in which the structures include embedded or integrated sensors that monitor one or more structural parameters such as stress, strain etc. Such smart structures are described, for example, in U.S. Pat. Nos. 4,983,034 and 4,930,852 issued to Spillman and Wheeler et al. respectively, and commonly owned by the assignee of the present invention, the entire disclosures of which are fully incorporated herein by reference. The basic concept is that the integrated sensors can be used as health monitors for the structure to characterize the structural performance of the materials. Having such real time or near real time information can allow structures to be designed up to the material limits. In fact, the structures can further include active elements that provide adaptive compensation for structure performance. Such a smart structure concept is disclosed in U.S. Pat. No. 4,922,096 issued to Brennan and U.S. patent application Ser. No. 07/981,966 filed on Nov. 25, 1992 for "Smart Structure With Non-Contact Power and Data Interface", which are commonly owned by the assignee of the present invention, the entire disclosures of which are fully incorporated herein by reference.

Optical sensors such as those described in the referenced patents are a desirable solution to providing smart structures. Such sensors conveniently use optic fibers as part of the active sensor element, and of course, optic fibers are small and flexible thus making them ideal for embeddment in composite structures without adversely affecting structural integrity. For example, structural strain can be monitored by transmitting light through one or more embedded optic fibers that bend under stress, strain etc. thus affecting the transmission characteristics of the light through the fiber.

The successful use of such smart structures, optics based or otherwise, requires a reliable and accurate way to interrogate the sensors. Optical sensors present a particularly difficult ingress/egress data and power problem because light energy must be delivered to the sensor and the output light pattern or signals corresponding thereto must be coupled back out to the outside world for processing and analysis. Using hardwired or other mechanical, electrical or optical connections between the sensors and external hardware is difficult from a manufacturing stand point due to the need for precise machining and very tight tolerances to allow efficient coupling. Although it is generally known to use RF coupling for contactless interrogation of some sensors, such approaches typically depend on frequency domain analysis (such as by detecting a resonant frequency shift based on a sensed parameter.) These approaches are not practical, therefore, for resistive sensors, nor for extracting data from optical sensors because these sensors produce amplitude dependent outputs.

Accordingly, the need exists for non-contact apparatus and methods for interrogating smart structure sensors, particularly embedded sensors. Such needed apparatus and methods should also be convenient to use for resistive sensors and optical sensors.

SUMMARY OF THE INVENTION

In response to the aforementioned problems with known systems and the need for a contactless interrogation technique, the present invention contemplates apparatus for contactless interrogation of an sensor integrally disposed with a structure including coil means for coupling signals across a gap between a sensing circuit having a sense coil and an interrogation circuit having an exciter coil connectable to a variable frequency supply, the sensing circuit comprising means for changing current through the sense coil in relation to the sensor output; the interrogation circuit comprising means for detecting current in the exciter coil induced by the sense coil current; and control means for determining the sensor output based on the exciter coil current compensated for the gap.

The invention also contemplates the methods employed in the use of such apparatus, as well as a method for contactless interrogation of a sensor of the type that exhibits an output characteristic that changes in known relation to a physical parameter including the steps of:

a. using the sensor characteristic to determine a variable component in a reactive circuit;

b. applying a first frequency input signal to the circuit using magnetic coupling across a gap with the first frequency being in a range such that a first circuit output is independent of the variable component;

c. applying a second frequency input signal to the circuit with the second frequency being in a range such that a second circuit output is dependent on the variable component; and d. determining the sensor output as a function of the first and second circuit outputs.

These and other aspects and advantages of the present invention will be readily understood and appreciated by those skilled in the art from the following detailed description of the preferred embodiments with the best mode contemplated for practicing the invention in view of the accompanying drawings.

DETAILED DESCRIPTION OF THE INVENTION

Figure 1:
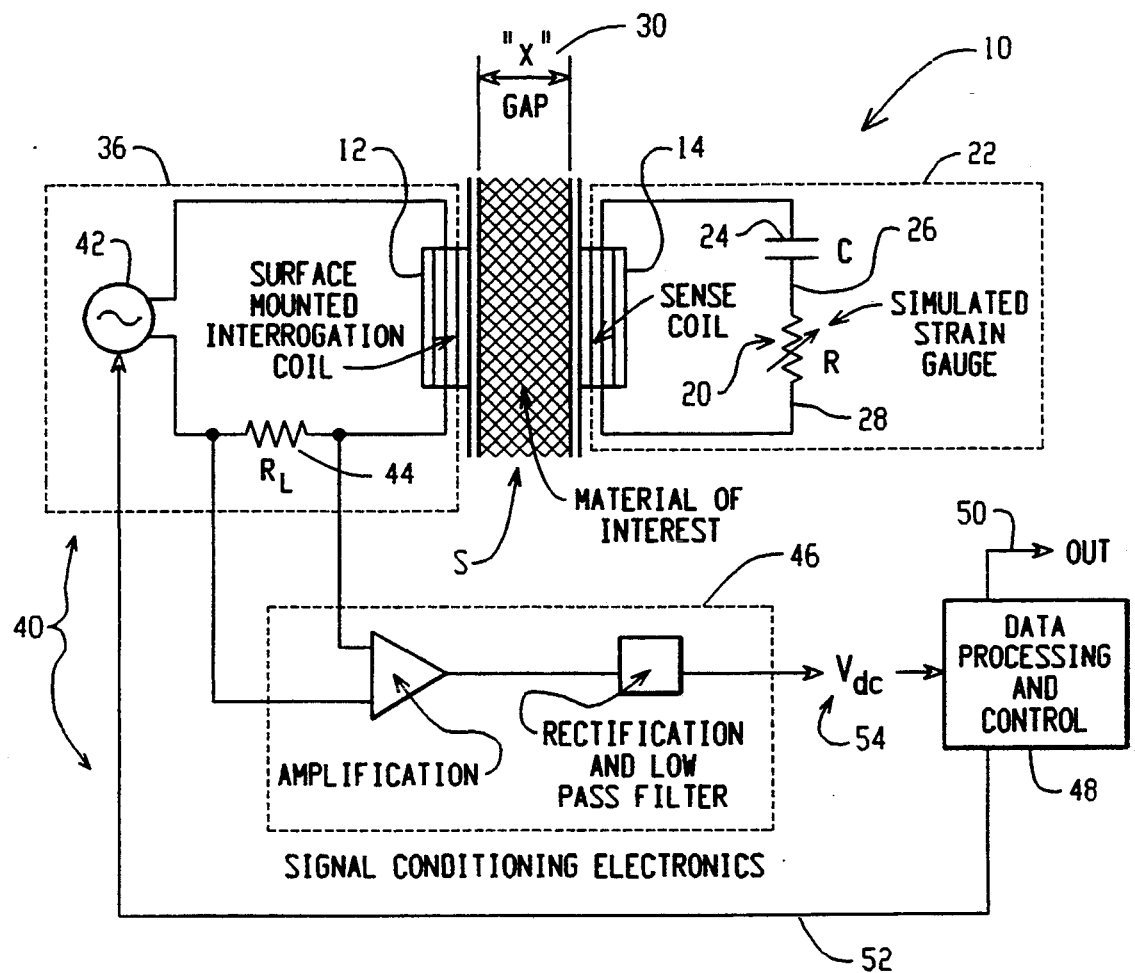
FIG. 1 is a simplified diagram of a sensor interrogation apparatus according to the present invention for contactless interrogation of sensors used in or on structures.

With reference to FIG. 1, we show in diagrammatic form an apparatus 10 that embodies the present invention for contactless interrogation of a sensor or plurality of sensors embedded in a structure. Although specific reference is made herein to embedded sensors, those skilled in the art will readily appreciate that the term "embedded" is intended to be interpreted in its broadest sense to include, for example, sensors disposed on a surface of or integrated with a structure. In addition, the term "contactless" is intended to be construed in its broadest sense wherein data and/or energy are coupled into and/or out of the structure by magnetic coupling rather than, for example, with electrical or optical contacts. The particular structure involved in the use of the invention may be any structure made of material compatible with apparatus and methods embodying the invention. Such materials include graphite/epoxy composites, fiberglass, plexiglass and so on to name just a few. Clearly, this list is intended to be representative and not exhaustive of the possible choices of material available to the applications designer. The material selected, however, should be relatively non-absorptive of the electromagnetic energy spectrum used to interrogate the sensor(s).

The apparatus 10 includes a preferably surface mounted primary or interrogation coil 12, and a secondary or sense coil 14. In the example of FIG. 1, the sense coil 14 is embedded in a structure, S, although typically the sense coil will be disposed at or near a surface of the structure. The sense coil is part of a resonant sensing circuit that is embedded in the structure and which, in combination with the other components of the apparatus 10, is used for detecting the condition or output of a sensor dependent element 20 that is embedded in the structure. In one example described herein, the sensor dependent element 20 is a variable resistance strain gauge for detecting structural stress and strain forces that the structure S is subjected to. However, this specific example is intended to be exemplary and not limiting. The invention can be used with any sensor that produces a variable resistance output, or that produces an output that can be converted to a variable resistance, or that produces an output that can change or modulate the value of one or more of the resonant circuit components. As a further example, an optical sensor that produces an output consisting of modulated light beams can be interrogated by using the output light to affect an impedance in the apparatus 10, such as a photosensitive resistor.

As stated, the sense coil 14 is connected in a resonant sensing circuit 22 that includes the sensor dependent element 20 and a capacitance 24. It is important to bear in mind that the variable resistance R used in FIG. 1 to represent the sensor 20, may in actual practice be a resistance that is affected by the output of the sensor, and not part of the sensor itself. The sensor itself can thus be disposed within the structure S at any desired location an-connected to the resonant circuit by leads 26,28. For example, in the case of an optical sensor, the sensor output could be coupled to the sensor dependent element 20 by optic fibers embedded in the structure with the sensor.

The sense coil 14 is preferably embedded in the structure at a known location so that the interrogation coil 12 can be positioned in close proximity thereto to achieve good magnetic coupling between the coils. For example, the coil 12 could be embedded in a conformal structure that can be placed over the structure S. A suitable arrangement for such alignment is disclosed in the above-referenced co-pending U.S. patent application Ser. No. 981,966. As illustrated in FIG. 1, typically the sense coil 14 and interrogation coil 12 will be separated by a gap 30. This gap often will include the structural material involved in the sensor 20 analysis, or could simply be air or other non-magnetic medium, for example, in the case of surface mounted coils and sensors.

The gap 30 defines a distance "x" that separates the interrogation coil 12 from the sense coil 14. This distance affects the quality of the magnetic coupling between the coils and consequently affects the ability to detect the condition of the sensor and to couple the sensor data from the structure to an analyzer. According to an important aspect of the invention, the gap x can be determined for each interrogation of the sensor, even on a real time basis, in order for the output signals to be adjusted or compensated for the particular gap distance existing at the time of the interrogation. This is a substantial advance over prior known systems because the ability to compensate for the gap permits the use of amplitude variant signals for accessing the sensor output from the structure, rather than frequency variant signals. Thus, the invention has significant benefits for use with optical sensors because many optical sensors produce outputs wherein the sensor data is encoded in light signals that are amplitude or intensity variant.

The interrogation or exciter coil 12 is part of an interrogation circuit 40 that includes: a variable frequency energy source 42 which may, for example, be a voltage controlled oscillator (sinusoidal or other suitable application specific wave form); a load or sensing resistor 44 (sometimes identified herein as $R_{44}$); a signal conditioning circuit 46; and a data processing and control circuit 48 that produces an output 50 that corresponds to the sensor output or condition, and produces a control signal on line 52 for controlling the frequency and the magnitude of the excitation signal that the oscillator 42 applies to the interrogation coil 12. The exciter coil 12, sensing resistor 44 and source 42 provide a resonant exciter circuit 36 that is used to induce currents in the sense coil 14 by magnetic coupling between the coils 12,14.

The basic operation of the exemplary apparatus 10 of FIG. 1 according to the invention is as follows. The sensing circuit 22 exhibits a resonant frequency ($f_s$ in FIG. 3) which we define as the frequency which is the point of maximum sensitivity to changes in $I_P$ for a given change in $R_{STRAIN}$ (maximum for $\Delta I_P/\Delta R_{STRAIN}$.) The resonant frequency $f_s$ is determined by the sum total of the reactive elements of the circuit which includes the inductance of the sense coil 14 and the interrogation coil 12, as well as the capacitance 24 (and parasitic capacitances $C_{P1}$ and $C_{P2}$ shown in FIG. 2) and the value of K. The amplitude of the current through the coil 14 is also a function of the sensor dependent element 20, particularly at the resonant frequency of the sensing circuit 22. When the exciter coil 12 has an AC signal applied, current in the exciter or primary coil 12 induces current in the secondary or sense coil 14, as in an air gap transformer. This current in the sense coil, however, is reflected back to the exciter coil 12 by the mutual coupling of the two coils. The sense resistor 44 is used to detect the current in the exciter coil 12. When the excitation frequency is approximately at the resonant frequency of the sensing circuit 22, the current in the exciter coil changes maximally in relation to the value of the sensor dependent element 20. Thus, the sensor condition can be determined as a function of the detected current in the exciter coil. The signal conditioning circuit 46 is used to amplify the voltage developed across the sense resistor 44 by the exciter circuit current. This amplified voltage is then rectified and low pass filtered to provide a DC voltage output. The control circuit 48 then uses the DC value to determine the state or output of the sensor 20.

As noted herein, the amplitude of the current that flows in the coils is dependent on the value of the sensor dependent element 20. The coil currents, however, are also strongly a function of the size and characteristics of the gap 30. This is because the gap, and the medium in the gap, between the coils proportionately affects the magnetic coupling between the two coils. For example, the coupling constant, K, between the coils is directly proportional to the inverse distance x. Therefore, the magnitude of currents induced in the coils is a function of the distance x. This has been one of the major reasons why amplitude based measurements have heretofore been impractical, because precise control of the gap 30 is difficult, and in fact near impossible when it is desired to have the external interrogation circuit movable between different sensor locations in a structure. In accordance then with an important aspect of the invention, the control circuit 48 is configured in a manner such as set forth hereinafter to characterize the gap 30 and thus accurately determine the sensor condition based on amplitude variant signals from the exciter circuit.

Figure 2:
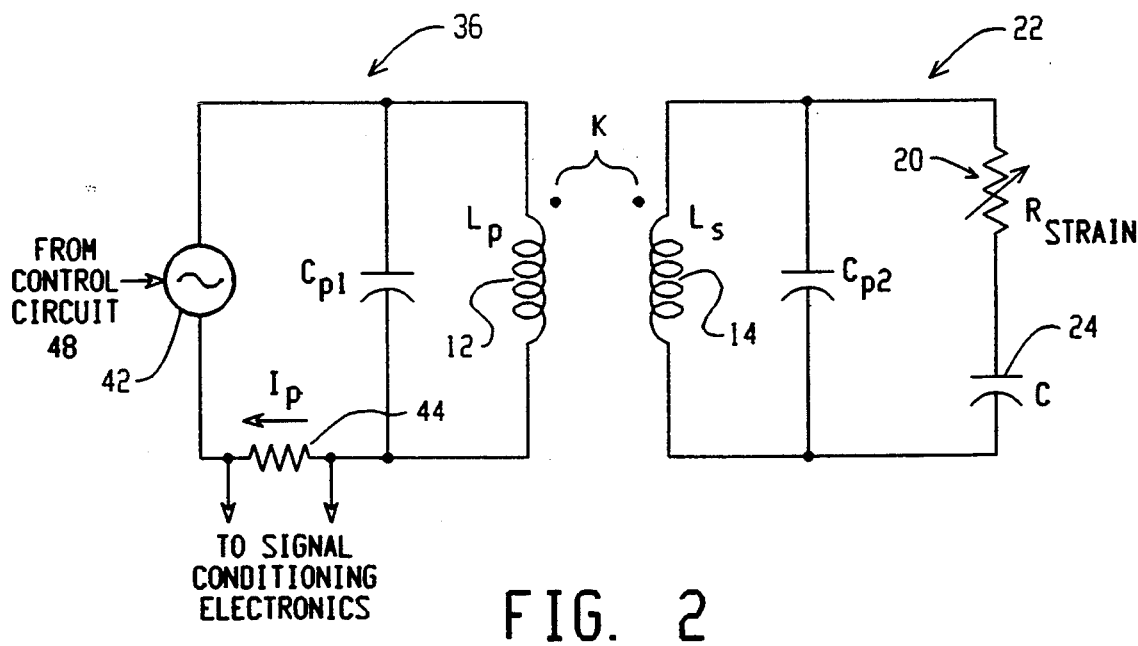
FIG. 2 is a detailed electrical schematic diagram of a circuit such as used with the apparatus of FIG. 1 that can be used to interrogate a sensor embedded in or disposed on a structure.

With reference next to FIG. 2, we show a more detailed circuit model of an exciter circuit 36 and sensing circuit 22 useful in practicing the invention. As shown, the exciter circuit 36 includes the exciter coil 12 that has a determinable inductance, $L_P$. The coil 12 and associated components of the exciter circuit 36 also will exhibit an overall parasitic capacitance, $C_{P1}$, that appears in parallel with the coil inductance. The exciter circuit further includes the variable frequency oscillator 42 and the sensing resistor 44 used to sense the primary or excitation current $I_P$. Thus, all components in the exciter circuit 36 are known quantities for each application.

The resonant sensing circuit 22 includes the sense coil 14 which has a determinable inductance, $L_S$. The sense coil 14 also has an associated parasitic capacitance, which parasitic capacitance is in effect part of the capacitance $C_{P2}$ which is a discrete capacitor selected to optimize the sensitivity of the apparatus 10 to changes in the value of the element 20. In other words, the value of $C_{P2}$ can be selected, such as based on experimental data for specific circuits, to maximize the current $I_P$ induced in the exciter circuit 36 as a function of changes in the resistance $R_{STRAIN}$ (e.g. maximize the ratio $\Delta I_P/\Delta R_{STRAIN}$.) The sense circuit 22 also includes an additional discrete capacitor C which is selected to adjust the frequency at which the $\Delta I_P/\Delta R_{STRAIN}$ ratio is optimized. Thus, for the sense circuit 22, all of the component parameters are known quantities except the coupling constant, K, and the value of the sensor output (as represented by the unknown quantity $R_{STRAIN}$ in the specific example of the described embodiment, but more generally the value of the sensor dependent element 20).

Figure 3:
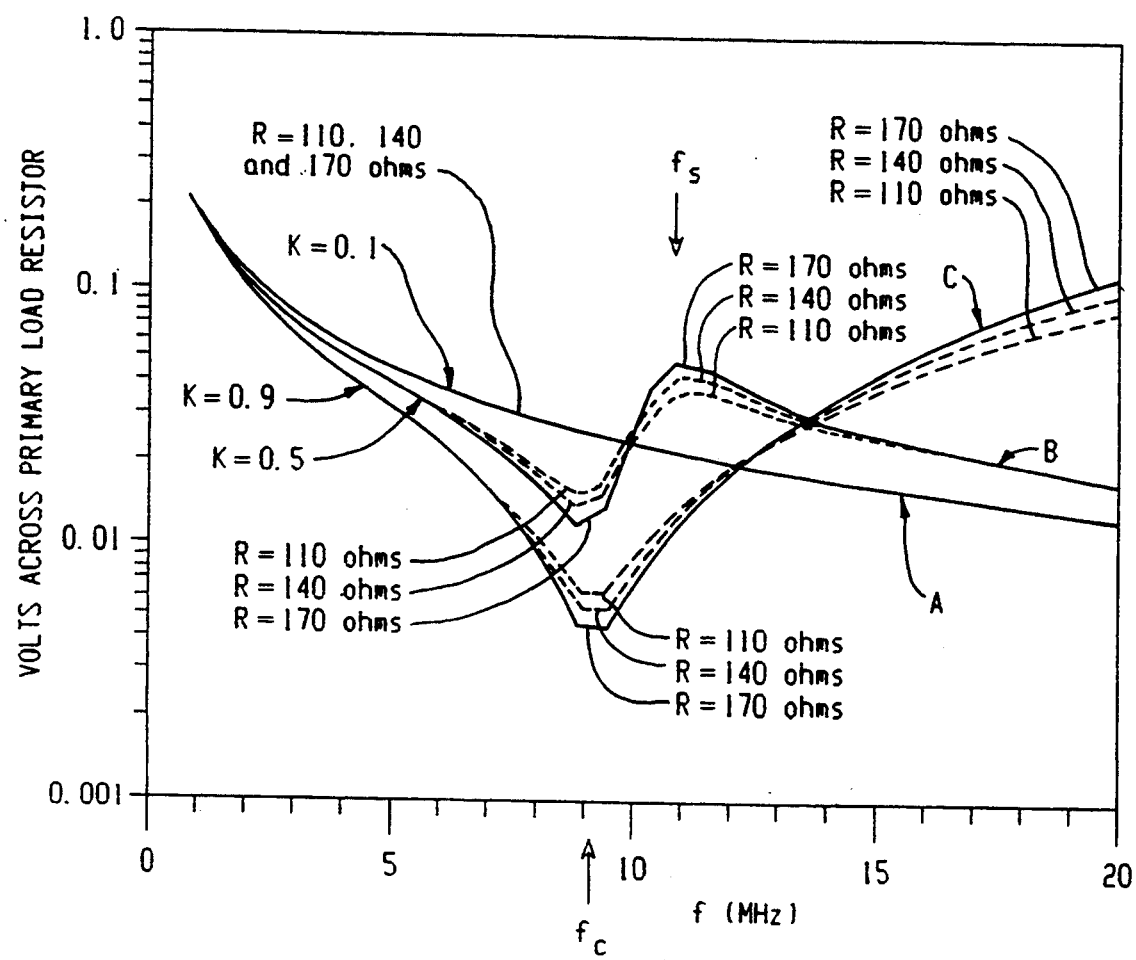
FIG. 3 is a representative graph of primary current (as detected by voltage across a sense resistor) vs. excitation frequency for the circuit of FIG. 2.

FIG. 3 is a graph showing in a representative manner a typical frequency response characteristic of the circuit of FIG. 2, as shown by the family of curves determined by monitoring the primary current $I_P$ vs. excitation frequency for different K values (in this example for K=0.1, K=0.5 and K=0.9) and different resistance values for the sensor dependent element 20. Note that the Y-axis is a logarithmic scale. In this example, as in the system embodiment of FIG. 1, the current $I_P$ is detected as a voltage developed across the sense resistor 44, with this voltage being rectified to a DC value.

Several important attributes of the circuit should be noted. Graph A corresponds to the frequency response for K=0.1, which may, for example, correspond to a rather large gap (high value of "x" on the order of approximately ½ the coil diameter) with reduced magnetic coupling between the coils 12,14. Virtually no sensitivity is present to different values of the element 20. In other words, regardless of the excitation frequency, the current in the exciter circuit 36 is not a detectable function of the value of the element 20. It will further be noted that as excitation frequency increases, the current $I_P$ initially decreases, indicative of the exciter circuit 36 resonant impedance; however, if the frequency sweep were extended beyond 20 MHz (not shown in FIG. 3), the current $I_P$ would reach a minimum at the resonant frequency of the $L_P C_{P1}$ circuit and then increase to a maximum value approximately equal to $V_{42}/R_{44}$ (the source voltage divided by the sense resistor.)

Graph B corresponds to the frequency response for K=0.5, which may, for example, correspond to a moderate gap (intermediate value of "x" on the order of approximately 1/10 the coil diameter) with somewhat reduced magnetic coupling between the coils 12,14. First note that at a frequency generally designated $f_c$, the circuit exhibits some sensitivity to the value of the resistance of the element 20. This occurs, for example, around 9-10 MHz. At higher frequencies, for example, at the frequency generally designated $f_s$, the circuit exhibits substantially increased sensitivity to the value of the element 20, for example, around 11 MHz. Further note that at lower frequencies, for example around 5 MHz, the frequency response is again independent of the value of the resistance of element 20. The frequency $f_c$ can be approximated by the formula $1/(2\pi*SQRT(L_S[C_{P2}+C]))$.

Graph C corresponds to the frequency response for K=0.9, which may, for example, correspond to a small gap (short value of "x" on the order of less than 1/10 the coil diameter) with a high degree of magnetic coupling between the coils 12,14. First note that at approximately the same frequency generally designated $f_c$, the circuit exhibits some sensitivity to the value of the resistance of the element 20, and a greater sensitivity than when K=0.5. At higher frequencies the circuit again exhibits substantially increased sensitivity to the value of the element 20, for example, at a frequency generally around 20 MHz. Further note that at lower frequencies, for example around 5 MHz, the frequency response is again independent of the value of the resistance of element 20.

Also it should be noted that at the lower frequency range, such as at 5 MHz, the voltage detected across the sense resistor 20 is dependent on the value of K, but independent of the value of the resistance 20. Therefore, the value of K can be determined by applying a first excitation frequency, such as 5 MHz, to the exciter coil 12, and detecting the resultant current $I_P$. Having determined the value of K, the value of the element 20 can be determined by applying a second excitation signal at a frequency and magnitude range wherein the circuit is known to exhibit maximum sensitivity to the value of the element 20. The second frequency can be selected in at least two ways. First, as shown in FIG. 3, the frequency $f_c$ is not strongly dependent on the value of K. Therefore, the first and second excitation frequencies can simply be fixed values based on the particular circuit components used in an application. Alternatively, sensitivity and accuracy can be increased by adaptively selecting the second frequency based on the determined value of K (from the measurement made at the first excitation frequency.) That is, the second frequency can be selected so that it corresponds to a circuit response at which the current $I_P$ is more strongly dependent on the value of the element 20. As is clear from FIG. 3, however, the value of this second frequency depends on the value of K. Therefore, the control circuit 48 is configured to determine adaptively the correct value of the second excitation frequency for each possible value of K.

A mathematical model of the circuit of FIG. 2 can be derived from fundamental circuit theory:

$$I_p = \frac{V_{sig}}{Z_p + j\omega L_p + \left[\frac{\omega^2 K^2 L_p L_s}{Z_s + j\omega L_s}\right]} \quad \text{(Eq. 1)}$$

where:

$$V_{sig} = \frac{j\omega V_s C_{p1}}{1 + [j\omega C_{p1} R_{44}]} = \frac{V_s Z_p}{R_{44}}$$

$$Z_s = \frac{R_{STRAIN} + 1/j\omega C}{(1 + C_{p2}/C + j\omega R_{STRAIN})}$$

$$Z_p = \frac{j\omega C_{p1} R_{44}}{1 + j\omega C_{p1} R_{44}}$$

The only quantities in equation 1 that are unknown after the circuit components have been selected are K and $R_{STRAIN}$. Thus, if two measurements of $I_P$ are made at two different frequencies with one frequency being selected so that $I_P$ is independent of the value of $R_{STRAIN}$, and the other frequency selected so that $I_P$ is dependent on the value of $R_{STRAIN}$, then both unknown quantities can be determined.

With reference again to FIG. 1, it is now apparent that the control circuit 48 is configured to determine first the value of K by applying a first frequency to the exciter coil 12, and detecting the resultant voltage produced across the sense resistor 44. This voltage then indicates the value of K, from which the control circuit 48, for the adaptive processing method, selects a second frequency to apply to the exciter circuit such that the resultant voltage measured across the sense resistor corresponds to the value of the element 20.

A particular advantage of the invention is that an embedded sensor can be energized, interrogated and the sensor information coupled in a contactless manner to a processing circuit through the use of a single coil pair.

The control circuit 48 can be realized in the form of a microprocessor or similar controller that accesses data stored in memory based on circuit characterization data and look up tables so as to determine the values of K and $R_{STRAIN}$ and produce a corresponding output 50. This can be accomplished in a conventional data processing manner for extrapolating data based on empirically derived characterization values. For example, the specific circuit used for an application can be characterized based on actual frequency response data for different values of K and the element 20. This data can then be stored in look up tables for processing by the control unit 48. Although this approach may be feasible for some applications, other more complicated applications may require an extensive amount of test data to sufficiently characterize the circuit so that accurate values of K and the element 20 can be determined. This extensive data also requires large amounts of memory for access by the control circuit 48.

In accordance with another important aspect of the invention then, we have found that neural net processing can be used to implement either or both of the processing methods described above, i.e. the determination of K and $R_{STRAIN}$ based on optimized selections of the first and second excitation frequencies, or the adaptive processing technique in which the second excitation frequency is selected as a function of the value of K. We have further found that while the values of K and $R_{STRAIN}$ can be determined with good accuracy, we can substantially improve accuracy by using neural processing to calculate directly the values of "x" and strain, $\epsilon$. Of course, this is only an exemplary description. Strain is just one of many parameters that can be determined, and as previously described the element 20 can be used as a transducer to convert optical sensor output signals into resistance variations that can be determined by the neural processing. For convenience we will continue with the example of using the concepts of the invention for strain measurement, but such example is not to be construed in a limiting sense.

Figure 4:
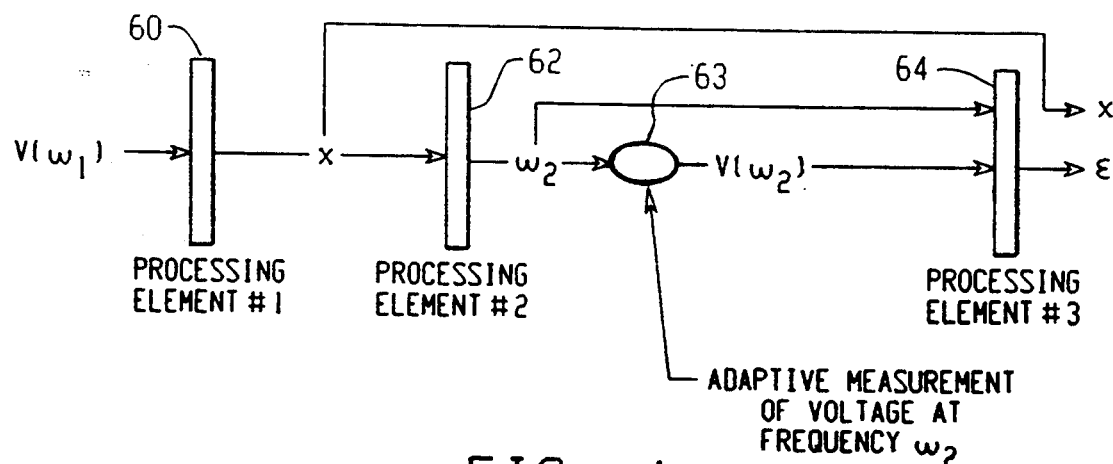
FIG. 4 is a block diagram of a neural net processing circuit that can be used with the sensor interrogation circuit of FIGS. 1 and 2.

With reference to FIG. 4, a suitable architecture is illustrated for a neural net processing methodology to determine the values of "x" and strain, $\epsilon$, or alternatively the values of K and $R_{STRAIN}$. Basically, the neural net includes three subnets identified 60, 62 and 64. The first subnet 60 is used to determine the value of "x" based on the voltage reading across the sense resistor 44 at a first excitation frequency, $\omega_1$. The second subnet 62 is used to determine the optimal value of the second frequency, $\omega_2$, about which the circuit exhibits maximum sensitivity to the changes in the element 20. An adaptive measurement at 63 is used to select an appropriate excitation voltage at frequency $\omega_2$ (for the source 42.) The magnitude is selected so that the signal processing is operated full range to provide maximum output signal at the minimum value of $R_{STRAIN}$. The selection of the excitation signal magnitude can be conveniently incorporated into the neural network training process. The third subnet 64 is used to determine the value of the sensor output (in this case strain) as a function of the voltage measured when the second excitation frequency is applied.

The neural nets are developed and trained in a conventional manner. Data is collected for the circuit frequency response across a selected frequency range while changing the values of "x" and strain in a known manner. This data is then used to train the neural nets. Accuracies of better than 1% have been achieved.

The neural nets used were generated following their detailed description in "Structure-unknown non-linear dynamic systems: identification through neural networks" by S. F. Masri, A. G. Chassiakos and T. K. Caughey in *Journal of Smart Materials and Structures*, Vol. 1., No. 1 pgs. 45–56. The nets utilized a single input which was preprocessed into components of an orthogonal polynomial basis set, i.e., $X \rightarrow X, X^2, X^3, \ldots, X^8$ so that 8 neurons comprised the fan out layer. The nets had two hidden layers having 10 neurons each and an output layer having one or two neurons depending upon requirements. The neurons utilized signoid activation functions. A listing of a training algorithm for one of the nets having a single output neuron is appended hereto. The algorithm is written in the Microsoft Quickbasic ® computer language.

While the invention has been shown and described with respect to specific embodiments thereof, this is for the purpose of illustration rather than limitation, and other variations and modifications of the specific embodiments herein shown and described will be apparent to those skilled in the art within the intended spirit and scope of the invention as set forth in the appended claims.

We claim:

1. Apparatus for contactless interrogation of a sensor integrally disposed with a structure comprising: coil means for coupling signals across a gap between a sensing circuit having a sense coil and an interrogation circuit having an exciter coil connectable to a supply, said sensing circuit operating as a load that changes in relation to the sensor output; said interrogation circuit comprising means for detecting amplitude of a signal responsive to said load and induced in said exciter coil across said gap; and control means for determining the sensor output based on said detected amplitude compensated for said gap.

2. The apparatus of claim 1 wherein said sense coil current is amplitude modulated in relation to the sensor output.

3. The apparatus of claim 1 wherein said control means applies a first operating frequency to said exciter coil for determining a parameter related to said gap, and applies a second operating frequency to said exciter coil for determining the sensor output, said second frequency being selected as a function of said gap parameter.

4. The apparatus of claim 1 wherein said sense coil and said exciter coil are magnetically coupled for transmitting sensor related signals between said coils.

5. The apparatus of claim 4 wherein said sensing circuit is a resonant circuit comprising said sense coil and a capacitance, said sensing circuit further comprising a sensor dependent element that varies current through said sense coil in relation to the sensor output.

6. The apparatus of claim 4 wherein said interrogation circuit comprises said exciter coil and an exciter coil current sensing means, said current sensing means producing an output related to current through said sense coil.

7. The apparatus of claim 6 in combination with a strain gauge connected to said sensing circuit and having a resistance characteristic that modulates current through said sense coil.

8. The apparatus of claim 7 wherein the sensor and said sensing circuit are embedded in a composite structure.

9. The apparatus of claim 8 wherein said interrogation circuit is external to the structure.

10. A method for contactless interrogation of a sensor of the type that exhibits an output characteristic that changes in relation to a physical parameter comprising the steps of:
   a. using the sensor characteristic to determine a variable component in a reactive circuit;
   b. applying a first frequency input signal to the circuit using magnetic coupling across a gap with said first frequency being in a range such that a first circuit output is independent of the variable component;
   c. applying a second frequency input signal to the circuit with said second frequency being in a range such that a second circuit output is dependent on the variable component; and
   d. determining the sensor output as a function of said first and second circuit outputs.

11. The method of claim 10 wherein said step of applying a second frequency input signal includes the step of selecting said second frequency and the magnitude of said second frequency input signal as a function of said first circuit output.

12. The method of claim 11 wherein the step of applying a first frequency input signal includes the step of selecting the first frequency in a range such that said first circuit output signal is dependent on a parameter of said gap.

13. The method of claim 12 wherein the step of using magnetic coupling across a gap includes the step of using two coils magnetically coupled to each other to interrogate the sensor by varying and detecting current through the coils in relation to the sensor output.

14. The method of claim 13 wherein the step of using the sensor characteristic to determine a variable component includes the step of using the sensor to vary a resistance in the circuit such that current through said coils depends on the resistance at said second frequency.

15. The method of claim 14 including the step of using a resistive strain sensor as the variable component.

16. The method of claim 10 wherein said steps of selecting said first and second frequencies, and determining the sensor output are each performed by a respective trained neural network.

17. The method of claim 10 wherein said circuit input and output signals are coupled to and from the circuit using two substantially identical coils separated by said gap.

18. The method of claim 17 further comprising the step of using RF frequency input signals coupled to the circuit from an exciter coil to a sense coil.

19. The method of claim 18 wherein said output signals comprise signals induced in said exciter coil by current flowing in said sense coil.

20. The method of claim 19 wherein the physical parameter is detected using a resistive element having a resistance that is a function of the parameter.

21. The method of claim 20 wherein the parameter is strain.

22. The method of claim 19 wherein the variable component is a resistive strain gauge.

23. The method of claim 22 wherein the variable component is a resistive semiconductor strain gauge.

24. Apparatus for contactless interrogation of a sensor of the type that exhibits a characteristic that changes in known relation to a physical parameter, the apparatus comprising reactive circuit means including a component having a value that is a function of the sensor characteristic; coupler means for applying first and second input signals to said circuit means at two different frequencies across a gap and for detecting first and second output signals produced by said circuit means; and control means for controlling said input signals and interpreting said output signals; said first output signal being related to said gap independent of said component value, and said second output signal being related to said component value.

25. The apparatus of claim 24 wherein said coupler means comprises an exciter coil and a sense coil separated by said gap, said exciter coil being connectable to a variable frequency energy source, said input signals being inductively coupled from said exciter coil to said sense coil.

26. The apparatus of claim 25 wherein said output signals comprise signals induced in said exciter coil by current flowing in said sense coil.

27. The apparatus of claim 24 wherein said control means receives said first output signal, determines a parameter related to said gap, and selects said second frequency as a function of said gap parameter.

28. The apparatus of claim 27 wherein said control means selects said first frequency in a range in which said circuit means produces an output independent of said component value.

29. The apparatus of claim 28 wherein said control means selects said second frequency in a range in which said circuit means produces an output related to said component value.

30. The apparatus of claim 29 wherein said component is a variable resistance and said circuit means comprises a RLC circuit that exhibits a resonant frequency at which current in said sense coil is a detectable function of said resistance.

31. The apparatus of claim 24 wherein said control means comprises neural net means for determining a gap parameter as a function of said first output signal, for selecting said second frequency as a function of said gap parameter, and for determining said component value as a function of said second output signal.

32. The apparatus of claim 31 wherein said neural net means comprises three neural subnets for respectively determining said gap parameter, selecting said second frequency and determining said component value.

33. The apparatus of claim 1 wherein said supply provides an excitation signal of selectable frequency to said exciter coil, and further wherein said induced load responsive signal has a frequency that substantially matches said excitation signal frequency.

* * * * *